:::
United States Patent Office 3,044,965
Patented July 17, 1962

3,044,965
PROCESS FOR THE MANUFACTURE OF BISMUTH CATALYSTS
James L. Callahan, Bedford, Ohio, assignor to The Standard Oil Company, Cleveland, Ohio, a corporation of Ohio
No Drawing. Filed Apr. 16, 1959, Ser. No. 806,781
6 Claims. (Cl. 252—437)

The present invention is directed to the preparation of catalysts which may be employed in certain chemical processes which involve oxidation reactions. More particularly, the invention is directed to a bismuth silico-molybdate and bismuth silico-phosphomolybdate catalysts in a form suitable for use in a so-called "fluidized" catalytic reactor.

In co-pending application Serial No. 757,107 filed August 25, 1958 and now abandoned, of which I am a joint inventor, there are disclosed certain catalyst compositions containing bismuth, molybdenum, silicon, oxygen and phosphorus which are useful in certain hydrocarbon oxidation reactions. In accordance with the disclosure of the aforesaid application, the catalysts may have the following composition ranges:

| Element: | Weight percent |
|---|---|
| Bismuth | 4.5–55 |
| Molybdenum | 2.5–32 |
| Silicon | 0.6–42 |
| Oxygen | 20–50 |
| Phosphorus | 0–5 |

However, the atomic ratio of bismuth to molybdenum in the catalyst must be above 2:3. Various methods of preparing the catalyst are also disclosed in the aforesaid patent application, including a suggestion that the catalysts be prepared by spray drying techniques. Accordingly, it is the object of this invention to provide a process for the manufacture of these catalysts which will yield a product having outstanding qualities and uniform properties.

In brief, my invention comprises the following steps:
(1) Preparing an acidic slurry of the catalyst ingredients comprising a small amount of ammonium nitrate.
(2) Spray drying of the slurry
(3) Subjecting the spray dried product to heat treatment whereby the catalyst is calcined The process of this invention is described in greater detail in the following paragraphs.

Preparation of the Catalyst Slurry

As indicated above, the presence of ammonium nitrate in the slurry of the catalyst ingredients is necessary to obtain the advantages of this invention. If ammonium nitrate is not present in the catalyst slurry, the resulting catalysts will at times exhibit relatively poor quality as to either its physical or chemical characteristics; whereas, when the ammonium nitrate is present in the amounts specified hereinafter, the resulting catalyst possesses uniform good quality.

The manner in which the ammonium nitrate affects the final composition is not fully understood but it is postulated that the ammonium nitrate, because of its relatively low melting point, forms a matrix in which the other ingredients of the slurry are distributed during the spray drying operation. Subsequent calcination of the spray dried catalyst leaves the remaining ingredients in spherical particles that have a smooth, glassy appearance and these particles possess outstanding resistance to attrition when they are utilized as a catalyst in a fluidized bed reactor. However, the theory which explains the beneficial results obtained with ammonium nitrate is unimportant to the invention since I have found that so long as the slurry contains at least about 1 weight percent of ammonium nitrate, the final product always exhibits outstanding properties. While larger amounts of ammonium nitrate may be present in the catalyst slurry, I have found that there is generally no point in exceeding 10 weight percent ammonium nitrate. Furthermore, it is not necessary that the ammonium nitrate be added as a compound to the catalyst slurry as it can be conveniently formed in situ by the reaction of other ingredients in the acidic catalyst slurry.

The bismuth which is employed in the catalyst preparation by the process of this invention may originate either as the metal or as a salt thereof. If the bismuth metal is employed as the starting material, it is necessary to first dissolve it in a solution of nitric acid before adding it to the catalyst slurry. If a salt is employed, the salt is first dissolved in water so that it may be added to the catalyst slurry and readily mixed with the other ingredients thereof.

Similarly, the source of the molybdenum is in no way critical and various molybdenum compounds may be employed. If it is desired to form the ammonium nitrate in situ, it may be convenient to employ an ammonium salt of molybdenum such as ammonium heptamolybdate or ammonium dimolybdate. The source of the phosphorus may be phosphoric acid or the phosphorus may be obtained from phosphomolybdic acid which would provide both molybdenum and phosphorus.

Silicon is obtained, for the purposes of this invention, from silica and in general I prefer to employ a low alkali aqueous silica sol in the preparation of the catalyst slurry. Several such silica sols are available commercially and they may contain varying amounts of silica. A particularly useful commercial product contains 30 percent by weight of silica.

It is, of course, obvious from the preceding description that the exact quantities of the various ingredients to be employed in the preparation of the catalyst slurry may vary considerably and that the actual amounts will depend upon the final composition desired. The amounts to be employed in any case may readily be determined by simple calculations.

It is important that the ingredients of the catalyst slurry be thoroughly mixed before spray drying and the mixing is conveniently accomplished by the use of conventional mixing equipment. Since several of the ingredients of the catalyst slurry are strongly acidic, it is necessary to take this into account in selecting the materials of construction for the mixing equipment, but this aspect of the mixing procedure is fully understood by those skilled in the art and forms no part of the present invention.

Spray Drying of the Catalyst Slurry

The spray drying step in the process of this invention is not critical and conventional spray drying equipment and techniques may be employed in the process of this invention. The principal advantage of spray drying is that it results in the production of a spherical particle which is usually not obtainable by any other drying method. The equipment usually consists essentially of a drying chamber, a source of hot gases, a means of atomizing the liquid feed and a method of separating the dry product from the exhaust gases. Various auxiliary equipment may be included such as wet dust collectors to recover excessive fine dust, air sweepers or mechanical rakes to remove dry product from within the chamber and the like. The equipment may be operated with countercurrent or co-current gas flow and may be heated by oil-, gas-, or coal-fired furnaces, indirect steam heaters, indirect coal-fired heaters, or by waste gases from plant boiler houses and the like. The inlet gas temperatures may vary over a wide range, but in general I prefer not to exceed about 1000° F. Atomization may be accomplished by any one of several conventional atomizing devices; as for example, high-pressure nozzles, two-fluid nozzles and high-speed rotating discs. The size of the final product will depend upon the degree of atomization of the liquid slurry but this can be varied over a wide range in accordance with techniques well known in this art. In the case where the catalyst is to be employed in a fluidized reactor, a size range of 5 to 250 microns is preferred.

In general, the liquid slurry of catalyst ingredients is pumped into the atomizing device, which in the case of a countercurrent spray dryer, is located near the top of the spray drying chamber. Hot gas is admitted at the bottom of the chamber and flows upwardly countercurrently to the descending globules of catalyst slurry to an exit at the top of the spray dryer. A spray dryer may be operated with a feed which is either a true solution or a slurry and, in the case of a slurry, it is usually desirable to have a relatively high solids content in the slurry so as to reduce the cost of removing water or other solvent from the slurry. The product of the spray dryer may be collected either continuously or intermittently as the size of the batch to be prepared and other considerations may dictate.

*Calcination of the Spray Dried Product*

In order to obtain the optimum properties of the spray dried product it is necessary to subject the product to a calcination step at a temperature in the range of 700 to 1100° F. and preferably about 800° F. I have found that the calcination step may be conveniently conducted in a direct-fired, mechanically driven rotary kiln; and, if a rotary kiln is employed, it is usually necessary to hold the spray dried product at the elevated calcination temperature for only a short time, i.e., on the order of about five to ten minutes. As an alternative to the rotary kiln, the spray dried product may be calcined in the fluidized bed reactor in which it is to be ultimately employed. The latter method, of course, may require slightly different conditions than those employed in the rotary kiln in order to obtain the proper degree of calcination, but there is nothing critical or unusual about these conditions and a detailed explanation of the various conditions which will give satisfactory calcination is therefore unnecessary.

The preferred embodiment of my invention is illustrated by the following example of the preparation of a bismuth silico-phosphomolybdate catalyst.

500 lbs. of a low alkali aqueous silica sol containing 30% silica were placed in a stainless steel mixing vessel equipped with an electric mixer. Next 1.2 liters of phosphoric acid was added to the mixing vessel and then 42.7 liters of an aqueous solution containing 83.3 lbs. of ammonium heptamolybdate were added to the mixing vessel. Finally, 42.7 liters of a 5% nitric acid solution containing 171 lbs. of bismuth nitrate were added to the mixing vessel. The mixture was then thoroughly stirred. This slurry was then pumped to a spray dryer at a rate of 13 lbs. per minute. The spray dryer was of the conventional co-current type and the drying chamber was an 18 ft. diameter concrete drum with a flat bottom. During the drying operation an inlet gas temperature of about 425° F. was maintained and the exit gas temperature was about 185° F. The slurry was atomized in a 7 in. diameter drilled hole wheel which was rotated at a speed of 5,000 r.p.m.

The spray dried product was recovered from the bottom of the drying chamber and it was then transferred to a calcination furnace where it was heated gradually to 800° F. and maintained at that temperature for ten hours. The calcined catalyst had a particle size range of 33 to 250 microns.

This product was subjected to a rapid attrition resistance test which measures the physical resistance to attrition of the catalyst and it was found to be superior to catalysts of the same composition prepared by conventional methods. Other tests showed that the catalytic activity of the catalyst was outstanding in a reaction involving oxidation.

In view of the broad teachings of the foregoing description, certain modifications of the present invention as illustrated by the specific example will undoubtedly occur to those skilled in the art. However, this application for Letters Patent is intended to cover all such modifications as would reasonably fall within the scope of the appended claims.

I claim:

1. A process for the manufacture of a catalyst suitable for use in a fluidized bed reactor selected from the group consisting of bismuth silico-molybdate and bismuth silico-phospho-molybdate, comprising the steps of (1) preparing a slurry comprising bismuth nitrate; a molybdenum compound selected from the group consisting of a heptamolybdate, a dimolybdate and phosphomolybdic acid; silica; and at least 1% by weight of ammonium nitrate, (2) subjecting said slurry to a spray drying operation whereby spherically shaped particles of relatively uniform small size are produced, and finally (3) collecting said particles from said spray drying operation and subjecting them to an elevated temperature whereby the calcination of the catalyst is effected.

2. A process for the manufacture of a catalyst suitable for use in a fluidized bed reactor selected from the group consisting of bismuth silico-molybdate and bismuth silico-phospho-molybdate, comprising the steps of (1) preparing a slurry comprising bismuth nitrate; a molybdenum compound selected from a group consisting of a heptamolybdate, a di-molybdate and phosphomolybdic acid; silica; a phosphorus compound selected from the group consisting of a phosphoric acid and a phosphomolybdic acid; and at least 1% by weight of ammonium nitrate, (2) subjecting said slurry to a spray drying operation whereby spherically shaped particles of relatively uniform small size are produced, and finally (3) collecting said particles from said spray drying operation and subjecting them to an elevated temperature whereby the calcination of the catalyst is effected.

3. A process for the manufacture of a catalyst suitable for use in a fluidized bed reactor selected from the group consisting of bismuth silico-molybdate and bismuth silico-phospho-molybdate, comprising the steps of (1) preparing a slurry comprising bismuth nitrate; a molybdenum compound selected from the group consisting of a heptamolybdate, a dimolybdate and phosphomolybdic acid; silica; and at least 1% by weight of ammonium nitrate, (2) subjecting said slurry to a spray drying operation whereby spherically shaped particles of relatively uniform small size are produced, and finally (3) collecting said particles from said spray drying operation and subjecting them to an elevated temperature in the range of about 700 to 1100° F. whereby the calcination of the catalyst is effected.

4. A process for the manufacture of a catalyst suitable for use in a fluidized bed reactor selected from the group consisting of bismuth silico-molybdate and bismuth silico-phospho-molybdate, comprising the steps of (1) preparing a slurry comprising bismuth nitrate; a molybdenum compound selected from the group consisting of a heptamolybdate, a dimolybdate and phosphomolybdic acid; silica; a phosphorus compound selected from the group consisting of a phosphoric acid and a phosphomolybdic acid; and at least 1% by weight of ammonium nitrate, (2) subjecting said slurry to a spray drying operation whereby spherically shaped particles of relatively uniform small size are produced, and finally (3) collecting said particles from said spray drying operation and subjecting them to an elevated temperature in the range of about 700 to 1100° F. whereby the calcination of the catalyst is effected.

5. A process for the manufacture of a catalyst suitable for use in a fluidized bed reactor selected from the group consisting of bismuth silico-molybdate and bismuth silico-phosphomolybdate comprising the steps of (1) preparing a slurry comprising bismuth nitrate; a molybdenum compound selected from the group consisting of a heptamolybdate, a dimolybdate and phosphomolybdic acid; silica; and at least 1% by weight of ammonium nitrate, (2) subjecting said slurry to a spray drying operation whereby spherically shaped particles having a relatively uniform size in the range of 5 to 250 microns are produced, and finally (3) collecting said particles from said spray drying operation and subjecting them to an elevated temperature whereby the calcination of the catalyst is effected.

6. A process for the manufacture of a catalyst suitable for use in a fluidized bed reactor selected from the group consisting of bismuth silico-molybdate and bismuth silico-phosphomolybdate comprising the steps of (1) preparing a slurry comprising bismuth nitrate; a molybdenum compound selected from the group consisting of a heptamolybdate, a dimolybdate and phosphomolybdic acid; silica; a phosphorus compound selected from the group consisting of a phosphoric acid and a phosphomolybdic acid; and at least 1% by weight of ammonium nitrate, (2) subjecting said slurry to a spray drying operation whereby spherically shaped particles having a relatively uniform size in the range of 5 to 250 microns are produced, and finally (3) collecting said particles from said spray drying operation and subjecting them to an elevated temperature whereby the calcination of the catalyst is effected.

References Cited in the file of this patent
UNITED STATES PATENTS

| | | |
|---|---|---|
| 2,334,192 | Hanford | Nov. 16, 1943 |
| 2,470,190 | Schmerling | May 17, 1949 |
| 2,874,191 | Foreman | Feb. 17, 1959 |
| 2,881,212 | Idol et al. | Apr. 7, 1959 |